Dec. 19, 1922.
P. A. WEIGEL.
SHOCK ABSORBING STABILIZING DEVICE FOR AUTOMOBILES.
FILED DEC. 6, 1921.
1,439,346.
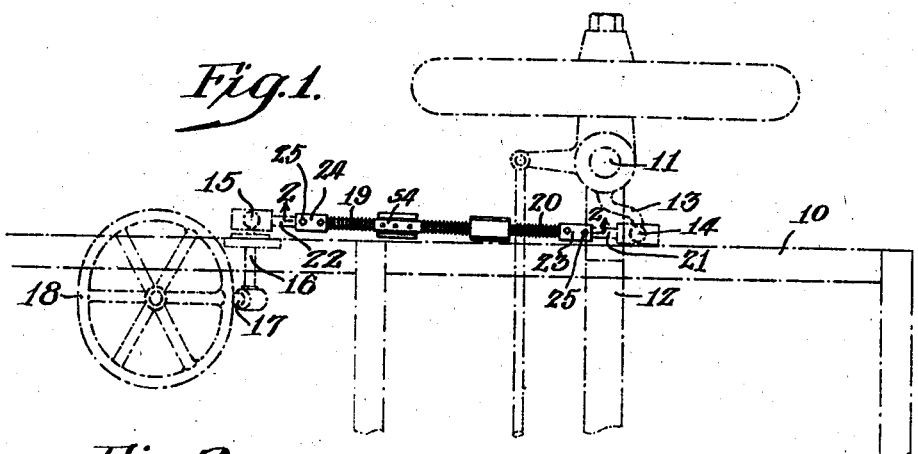
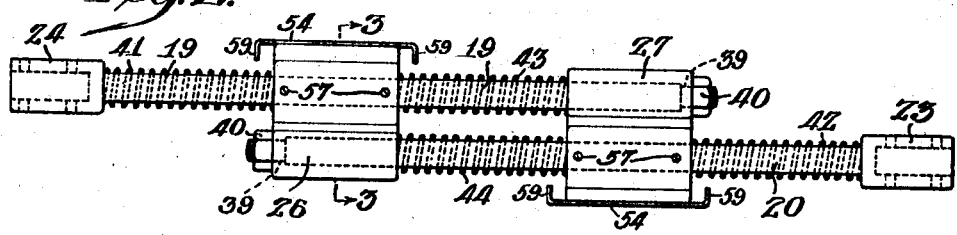
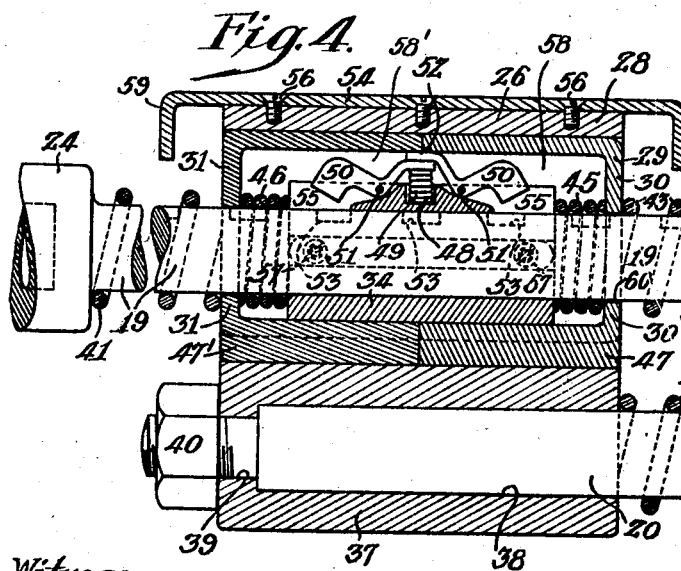
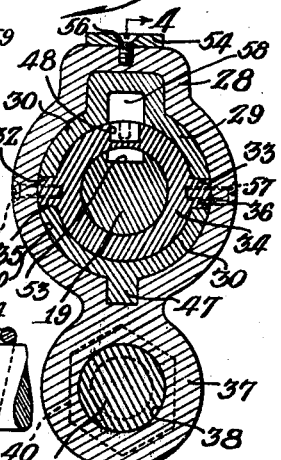
Witness:
Walter Chum.
Inventor
Philip A. Weigel.
by his Attorney.

Patented Dec. 19, 1922.

1,439,346

UNITED STATES PATENT OFFICE.

PHILIP A. WEIGEL, OF RIVERTON, NEW JERSEY.

SHOCK-ABSORBING STABILIZING DEVICE FOR AUTOMOBILES.

Application filed December 6, 1921. Serial No. 520,205.

*To all whom it may concern:*

Be it known that I, PHILIP A. WEIGEL, a citizen of the United States, residing at Riverton, in the county of Burlington and State of New Jersey, have invented certain new and useful Improvements in Shock-Absorbing Stabilizing Devices for Automobiles, of which the following is a specification.

This invention relates to a shock-absorbing stabilizing device for automobiles.

The principal object of the invention is to provide a device that will prevent accidents to the front wheels or steering mechanism of automobiles in the event that the said front wheels should come in contact with a stone, rut, or other obstacle in the road while the car is in motion.

A further object of the invention is to provide means in connection with a device of the character stated, that in the event said steering mechanism should become inoperable, by reason of the breaking of a main spring of the stabilizing device, due to the crystallization of the metal or from other causes, safety latches will automatically operate therewith, whereby the automobile may still be operated in the conventional manner.

These objects and other advantageous ends I attain by means of the mechanism hereinafter described, reference to be had to the accompanying drawings, in which:—

Figure 1 is a plan view of the left hand portion of an automobile, in outline, with the chassis removed, illustrating my stabilizing device operably connected with the steering mechanism;

Figure 2 is a longitudinal view of my stabilizing device on line 2—2 of Fig. 1;

Figure 3 is a transverse sectional view on line 3—3 of Fig. 2; and

Figure 4 is a sectional elevational view on line 4—4 of Fig. 3.

Referring now more particularly to the several figures of the drawing, wherein similar reference characters indicate like parts in all of the views, the numeral 10 represents the frame of an automobile provided with the usual knuckle joint 11 on the front axle 12 and an arm 13 extending from said knuckle joint 11 to a ball and socket joint 14.

Conventionally, a rod extends horizontally from the socket 14 to a like socket 15, from which said socket 15 a shaft 16 is operably connected with the steering post 17 of a hand-wheel 18.

In the present device, however, said conventionally horizontally extending rod is cut off adjacent its ends, leaving the portions or lugs 21 and 22 at each end thereof, secured in the sockets 14 and 15, respectively, as particularly illustrated in Fig. 1 of the drawing.

Duplicate rods 19 and 20 having their opposite ends upset to form sockets 23 and 24 are substituted for said conventionally horizontally extending rod.

The said duplicate rods 19 and 20 are of equal length but are positioned on a longitudinal plane, in spaced relation with each other so as to form essentially one rod and so that the socket end portion of each rod extends an equal distance beyond the terminal of the opposite rod, as particularly illustrated in Fig. 2 of the drawing.

The said rod lugs 21 and 22 are adapted to be secured in the sockets 23 and 24 by cross pins 25.

Said rods 19 and 20 are secured in the relative and spaced relation, as described above, by means of duplicate locking members 26 and 27, as particularly shown in Fig. 2 of the drawing.

As said locking members 26 and 27 are exactly counterpart, but are positioned in reverse order on the rods 19 and 20, but one of said members, viz:—26, will be described in detail.

Locking member 26 comprises an outer shell or casing 28, an inner cupped shell or casing 29, consisting of the two circular sectors 30 and 31, slotted laterally as at 32 and 33 to receive the integral lugs 35 and 36 of a latch sliding sleeve 34. The said locking member 26 terminates in a lug 37 having a lateral opening 38 therethrough for the positioning therein of the free end of the rod 20.

Said free end of the rod 20 is reduced in diameter adjacent its terminal to form a shoulder 39 within said opening 38 to limit the forward movement of said rod 20. A nut 40 is threaded on the portion of the reduced rod 20 projecting through said opening 38.

A lateral opening 60 is provided through the upper portion of the member 26 of sufficient area to accommodate the cupped inner shell 29, sleeve 34 and rod 19.

Main compression springs 41, 42, 43 and 44 are positioned around the rods 19 and 20, as particularly illustrated in Fig. 2 of the drawing. Springs 41 and 42 are adapted for compression between the sockets 23 and 24 and the outer surfaces of the outer casings of the locking members 26 and 27, and the springs 43 and 44 are adapted for compression between said locking members 26 and 27.

Compression springs 45 and 46, of lesser compression than the main springs 41, 42, 43 and 44, are positioned around the rods 19 and 20, within the locking members 26 and 27, and are adapted for compression between the inner cupped shell 29 and the sleeve 34.

Lugs 47 and 47' are provided on the lower portion of the shell 29 to maintain said shell 29 in alignment with the casing 28.

The upper portions of the sectors 30 and 31 of the cupped shell 29 are cut away as at 58 and 58' and two lever latches 50—50 are positioned therein and in slots 55—55 in the upper portion of the sleeve 34. Said lever latches 50—50 are fulcrumed by screws 51—51 therethrough and through the sleeve 34 as particularly shown in Fig. 4 of the drawing. The arms of said lever latches 50—50 overlap and are held in place against the upper inner walls of the sectors 30 and 31, of the shell 29, centrally thereof, by a spiral spring 49 positioned in an opening 48 in the upper portion of the sleeve 34. Said spring 49 being adapted for compression between the arms of said lever latches 50—50 and the base of said opening 48 in the sleeve 34. When the compression of the spring 49 is relaxed by the outward movement of the sectors 30 and 31 of the shell 29, said latch levers 50—50 will engage notches or recesses 53 in the rod 19.

To prevent the sectors 30 and 31 of the shell 29 from moving outwardly beyond a determinate point a limit stop 54 is provided. Said limit stop 54 comprises a bar secured to the locking member 26 by means of screws 56, as illustrated, and has the downwardly extending arms 59—59 against which the sectors 30 and 31, respectively, impinge when the desired limit of their travel is reached.

In operation:—The duplicate rods 19 and 20 are positioned and secured in the manner hereinabove described. When the front wheel of the automobile encounters an obstruction, the arm 13 on the knuckle joint 11 secured to the front axle 12 and in the ball and socket joint 14, will cause the rod 20, when the wheel moves inwardly, to compress the spring 42 inwardly between the socket 23 and the locking member 27, and the rod 19, will in unison therewith, compress the spring 41 inwardly between the socket 24 and the locking member 26, the springs 43 and 44 remaining, substantially, neutral. When the wheel moves outwardly, the rod 20 will compress the spring 44 outwardly and between the locking members 26 and 27, the rod 19, in unison therewith, compressing the spring 43 in like manner. In this instance the springs 41 and 42 remain, substantially, neutral. The force of the impact of the wheel against the obstacle is thus dissipated and cushioned by the springs 41, and 42, or 43 and 44, according to the direction the wheel turns after such impact. When the force of the impact is entirely spent the rods 19 and 20 resume their normal position.

The device is intended primarily to avoid "curb riding" when the driver of a car may be forced to run his car up to the curb at a sharp angle and to cushion the impact, from obstacle contact, which tends to injure or destroy the steering mechanism of the car. The device further tends to obviate the tiring effects on the wrists of a driver on a long drive or over rough roads, as the front wheels of the car will readily lend themselves to the unevenness of the road by reason of the springs 41, 42, 43 and 44 which gives a cushioning effect to the entire car and its various parts.

In conjunction with the stabilizing device just described, I have provided a locking mechanism within the members 26 and 27 operable upon the breaking of a main spring 41, 42, 43 or 44. When a main spring, for example, spring 43, breaks, the compression thereof is obviously relaxed, whereby the spring 45, which is normally under compression, but of lesser compression than the spring 43, can exert its pressure unopposed against the sector 30 of the cupped shell 29, causing said sector 30 to move outwardly. The spring to break will normally be the spring that is under pressure, hence there will be no pressure of the opposite spring 41 against the opposite sector 31 of the cupped shell 29 and the outward movement of the spring 46 will cause the sector 31 to also move outwardly in unison with the sector 30. These outward movements of the sectors 30 and 31 release the arms of the lever latches 50—50 which in turn relaxes the tension of the spring 49 whereby said lever latches 50—50 will engage notches 53 in the rod 19, maintaining a rigid condition of steering control until the broken spring can be repaired or replaced.

It will now be apparent that I have devised a novel and useful construction which embodies the features of advantage enumerated as desirable in the statement of the invention and the above description, and while I have in the present instance shown and described the preferred embodiment thereof which has been found in practice to give satisfactory and reliable results, it is to be understood that the same is susceptible of modification in various particulars without departing from the spirit and scope of the invention or sacrificing any of its advantages.

Having thus described my invention what

I claim as new and desire to secure by Letters Patent is:—

1. A stabilizing device of the class described, comprising duplicate horizontally extending rods, locking means to secure said rods in spaced relation with each other, an end of one rod being secured to a ball and socket joint connected with the knuckle joint on the front axle and the opposite end of the other rod being connected with a like ball and socket joint connected with the steering-wheel and compression means mounted on said rods to stabilize the steering control, substantially as described.

2. A stabilizing device of the class described, comprising two rods of equal length positioned on a longitudinal plane and in spaced relation by means of duplicate locking members in spaced relation to each other, so that the free end of each rod extends an equal distance beyond the terminal of the opposite rod, said free ends of said rods terminating in integral sockets adapted to be connected with a ball and socket joint connected to the knuckle joint on the front axle and a like ball and socket joint connected with the steering-wheel, respectively, and compression means positioned on each rod to stabilize the steering control, substantially as described.

3. A stabilizing device of the class described, comprising two rods of equal length positioned on a longitudinal plane and in spaced relation, duplicate locking members, in spaced relation and in inverted order, to hold said rods in position and so that the free end of each rod extends an equal distance beyond the terminal of the opposite rod, lateral openings in said members for the passage of said rods, lugs on said members having lateral openings for the positioning therein of the opposite ends of said rods, the free ends of said rods terminating in integral sockets adapted to be connected with a ball and socket joint connected to the knuckle joint on the front axle and a like ball and socket joint connected with the steering-wheel, respectively, and compression means positioned on each rod to stabilize the steering control, substantially as described.

4. A stabilizing device of the class described, comprising two rods of equal length positioned on a longitudinal plane and in spaced relation by means of duplicate locking members in spaced relation to each other, so that the free end of each rod extends an equal distance beyond the terminal of the opposite rod, said free ends terminating in sockets adapted to be connected with a ball and socket joint connected with the knuckle joint on the front axle and a like ball and socket joint connected with the steering-wheel, respectively, springs positioned on said rods and adapted for compression inwardly between the said sockets and said locking members by the inward movement of the front wheel of the car and like springs positioned on said rods adapted for compression outwardly by the outward movement of said wheel, substantially as described.

5. A stabilizing device of the class described, comprising duplicate horizontally extending rods, locking means to secure said rods in spaced relation with each other, an end of one rod being secured to a ball and socket joint connected with the knuckle joint on the front axle and the opposite end of the other rod being connected with a like ball and socket joint connected with the steering-wheel, springs mounted on said rods to stabilize the steering-control and latch mechanism operably connected with said locking means adapted to operate upon the breaking of any of said springs, substantially as described.

6. In a stabilizing device of the class described, provided with duplicate horizontally extending rods, duplicate locking members to secure said rods in spaced relation with each other and a plurality of springs mounted on said rods exteriorly of said locking members, latch mechanism operably positioned within each of said locking members, each latch mechanism comprising a lateral opening through the casing of said locking member, a sleeve mounted on each of said rods, a two sector inner cupped shell slotted laterally to receive lugs on said sleeve, means to secure said casing to said lugs, springs mounted on said rod within said casing of lesser compression than the exterior springs on said rod, compressed between said sleeve and the sectors of said cupped shell, lever latches secured to said sleeve, the arms thereof overlapping and the outer arm thereof being held against the said sectors at their junction by compression means, whereby upon the breaking of an exterior spring on said rod, said sectors will be forced outwardly, releasing the compression on said lever latches which thereby will engage notches on said rod, substantially as described.

7. In a stabilizing device of the class described, provided with duplicate horizontally extending rods, duplicate locking members to secure said rods in spaced relation with each other and a plurality of springs mounted on said rods exteriorly of said locking members, latch mechanism operably positioned within each of said locking members, each latch mechanism comprising a lateral opening through the casing of said locking member, a sleeve mounted on each of said rods, a two sector inner cupped shell slotted laterally to receive lugs on said sleeve, means to secure said casing to said lugs, springs mounted on said rod within said casing of lesser compression than the exterior springs on said rod, compressed between said sleeve and the sectors of said cupped shell, lever latches secured to said sleeve, the arms thereof overlapping and the outer arm being held against the said sectors at their junction by compression means, whereby upon the breaking of an exterior spring on said rod, said sectors will be forced outwardly, releasing the compression on said lever latches which thereby will engage notches on said rod and means to limit the outward movement of said sectors, substantially as described.

In testimony whereof I affix my signature.

PHILIP A. WEIGEL.